United States Patent
Tomishima et al.

[11] Patent Number: 5,798,728
[45] Date of Patent: Aug. 25, 1998

[54] RADAR SIGNAL PROCESSING APPARATUS

[75] Inventors: Chieko Tomishima; Takahiko Sugimoto, both of Tokyo, Japan

[73] Assignee: Mitsubishi Denki Kabushiki Kaisha, Tokyo, Japan

[21] Appl. No.: 726,763

[22] Filed: Oct. 7, 1996

[30] Foreign Application Priority Data

Nov. 28, 1995 [JP] Japan ................. 7-308730

[51] Int. Cl.⁶ ................. G01S 7/292; G01S 7/34
[52] U.S. Cl. ................. 342/93; 342/159; 342/162
[58] Field of Search ................. 342/93, 195, 196, 342/159, 162

[56] References Cited

U.S. PATENT DOCUMENTS

| | | | |
|---|---|---|---|
| 3,587,097 | 6/1971 | Stull, Jr. | 342/93 |
| 3,829,858 | 8/1974 | Bergkvist | 342/93 |
| 3,838,422 | 9/1974 | MacArthur et al. | 342/93 |
| 3,946,382 | 3/1976 | Kossiakoff et al. | 342/93 |
| 4,137,532 | 1/1979 | Taylor, Jr. et al. | 342/93 |
| 4,213,127 | 7/1980 | Cole | 342/93 |
| 4,318,101 | 3/1982 | Musha et al. | 342/93 |
| 4,523,325 | 6/1985 | Justus | 377/44 |
| 4,636,793 | 1/1987 | D'Addio et al. | 342/162 |
| 4,680,589 | 7/1987 | Bryant et al. | 342/196 |
| 4,709,236 | 11/1987 | Taylor, Jr. | 342/101 |
| 4,713,664 | 12/1987 | Taylor, Jr. | 342/91 |
| 4,754,278 | 6/1988 | Fazio et al. | 342/160 |
| 5,349,567 | 9/1994 | Reed | 367/100 |
| 5,457,462 | 10/1995 | Mitsumoto et al. | 342/93 |
| 5,485,157 | 1/1996 | Long | 342/160 |
| 5,499,030 | 3/1996 | Wicks et al. | 342/93 |
| 5,539,412 | 7/1996 | Mendelson | 342/192 |
| 5,644,315 | 7/1997 | Long | 342/93 |

FOREIGN PATENT DOCUMENTS

| | | |
|---|---|---|
| 3-242581 | 10/1991 | Japan. |
| 4-64078 | 2/1992 | Japan. |

OTHER PUBLICATIONS

Guy V. Morris "Airborne Pulsed Doppler Radar" Georgia Tech Research Institute.

*Primary Examiner*—John B. Sotomayor
*Attorney, Agent, or Firm*—Wolf, Greenfield & Sacks, P.C.

[57] ABSTRACT

The radar signal processing apparatus according to the present invention comprises a noise distribution measurement system comprising an edge detecting circuit, a noise distribution measuring circuit, a template, and a pattern matching circuit and an adaptive type target detecting circuit.

16 Claims, 13 Drawing Sheets

RADAR SIGNAL PROCESSING APPARATUS

FIELD OF THE INVENTION

The present invention relates to a signal processing apparatus for a searching or tracking radar for suppressing a clutter and a noise which are unnecessary signals from signals received by the radar, and detecting a required target signal.

BACKGROUND OF THE INVENTION

FIG. 10 is a basic block diagram showing a radar system using a radar signal processing apparatus, and in the figure, designated at the reference numeral 36 is an antenna, at 37 a transmitting/receiving select switch for the antenna, at 38 a transmitter for generating a transmitting wave, at 39 a receiver for changing a frequency of, restricting to a band of, detecting a wave of, and amplifying a received wave, at 40 an A/D converter for converting an output from the receiver from an analog signal to a digital signal, at 41 a radar signal processing apparatus, and at 42 an indicator for indicating a distance to and a direction of a target detected by the radar signal processing apparatus.

FIG. 11 is a basic block diagram showing a conventional type of radar signal processing apparatus 41 disclosed in, for instance, "Guy V. Morris; AIRBORNE PULSED DOPPLER RADAR, Artech house" (1988), and in the figure, designated at the reference numeral 1 is a clutter suppressing circuit for suppressing a clutter which is a reflected wave from the ground, mountains, sea, rain, and clouds or the like in a received signal, at 2 a linear wave detector for detecting an amplitude of the signal in which the clutter has been suppressed in the clutter suppressing circuit 1, at 3 is an integrator for improving a ratio (called as an S/N hereinafter) between a peak level of a target signal and r. m. s. (root mean square) of a noise contained in the received signal for the output from the linear wave detector 2, and at 43 a target detecting circuit for determining a signal at more than a specified threshold level as a target and detecting a target.

The target detecting circuit 43 is specially for CFAR (Constant False Alarm Rate), and FIG. 12 shows a block diagram of CA (Cell Averaging)—CFAR circuit, the most typical type in CFARs. In the figure, designated at the reference numeral 24 is a remark cell used to determine whether a target is contained in the cell or not, at 25 reference cells for providing data for computing a threshold level which is a reference level required when it is determined whether a target is contained in the remark cell 24 or not, at 44 an adder for computing the sum of data in the reference cells 25, at 34 a multiplier for calculating an average value of the data in the reference cells 25 by multiplying an output from the adder 44 by (1/N) and further multiplying the calculated average by a threshold level factor K, and at 35 a comparator for comparing data of an output from the multiplier 34 to that in the remark cell 24 and checking any target in the remark cell 24. The S/N-improved data received by the integrator 3 moves sequentially through the first half of reference cells 25 as input data to the CA-CFAR, and when the data has reached the remark cell 24, it is checked whether any target is therein or not, and then the data further moves through the last half of the reference cells 25.

FIG. 13 shows the principle. In the figure, the X-axis indicates a signal amplitude x, and the Y-axis indicates a share of generation frequency of signal amplitude x occupied in the whole signal, namely a probability density function p(x). The reference numeral 45 indicates a distribution of only a noise, and the reference numeral 46 indicates a distribution of (a target signal+a noise). In the figure, an area shadowed with descending lines which excesses the threshold level in the distribution indicated by the numeral 46 indicates a probability to be detected as a target, which is generally called a detection probability Pd. And also an area shadowed with ascending lines which excesses the threshold level in the distribution indicated by the numeral 45 indicates a probability in which a noise is detected as a false alarm, which is generally called as a false alarm probability Pfa. There has been known that the distribution 45 of noises follows the Rayleigh distribution, and what has been described above can be expressed by the following expression.

$$p(x) = \frac{x}{\sigma^2} \cdot \exp\left(-\frac{x^2}{2\sigma^2}\right)$$

wherein,
x: a signal amplitude
σ: variance of the signal amplitude x
p(x): a probability density function of the signal amplitude x And, by setting a threshold level to constant times of an average amplitude of a noise, it can easily be shown by an expression that a false alarm probability Pfa can be kept at a constant level, and the feature described above becomes a principle of the CA-CFAR. The feature is expressed by the following expression.

$$Pfa = \int_{TH}^{\infty} p(x)dx = \exp\left(-\frac{\pi}{4} k^2\right)$$

Wherein,
Pfa: a false alarm probability x: a signal amplitude
p(x): a probability density function of the signal amplitude x
TH: a threshold level
TH=k·x̄
(x̄: an average of the signal amplitude x) (K: a constant)

FIG. 12 shows a CA-CFAR circuit which is a circuit digitally realized based on the principle described above, and by setting K times (K: a constant) of an average value of the data in the reference cells 25 to a threshold level, a target is detected while a false alarm probability Pfa is kept at a constant level.

However, in a case where a distribution of noises namely a distribution of data in the reference cells 25 does not follow the Rayleigh distribution as shown in FIG. 13, the principle of the CA-CFAR will be collapsed and the false alarm probability Pfa will increase, so that noises may be detected more often, or a case where a target can not be detected may be generated in a case where any signal other than noises is contained in the reference cells 25, and for this reason the detection probability Pd of a target will drop.

In the CA-CFAR shown in FIG. 12, a constant false alarm rate can be insured so long as a noise distribution follows the Rayleigh distribution except a loss generated by the fact that a number of reference cells are limited numbers. However, when a radar system is constructed and actually operated in the field, a distribution of noises received by the CA-CFAR does not always follow the Rayleigh distribution which is a major premise of the principle, and for this reason there may be some case where a false alarm rate may increase. The conceivable causes for this phenomenon include a clutter which has not been completely removed by the clutter suppressing circuit 1 shown in FIG. 11, presence of a clutter which is out of objects to be suppressed by the clutter suppressing circuit 1, and further a change of a noise distribution caused by a signal processing itself such as in a clutter suppressing circuit 1, a linear wave detector 2, and an integrator 3.

SUMMARY OF THE INVENTION

It is one of objects of the present invention to realize a target detecting circuit 43 for suppressing a loss of a false alarm probability Pfa to the minimum and detecting a target even in a case where a distribution of noises does not follow the Rayleigh distribution.

Also in a case where a clutter which has not completely been removed by the clutter suppressing circuit 1 or a clutter which is not an object to be suppressed by the clutter suppressing circuit 1 is contained in a signal, there may be generated a phenomenon in which the threshold level in reference cells 25 will be increased, whereby a target will be failed to be detected.

The present invention was made to solve the problem described above, and it is another object of the present invention to realize a target detecting circuit 43 for suppressing a loss of a detection probability Pd to the minimum level while the constant false alarm is insured even in a case where any clutter is contained in the reference cells 25.

Also under situations where a plurality of targets are close to each other or a target may be affected by a jamming wave (called as a jammer hereinafter) due to large power, there may be generated a phenomenon where the threshold level will be increased by the fact that any other target or jammer described above are contained in the reference cells 25, whereby a target will be failed to be detected.

The present invention was made to solve the problem described above, and it is still another object of the present invention to realize a target detecting circuit 43 for suppressing a loss of a detection probability Pd to the minimum level while the constant false alarm is insured even in a case where any target and jammer are contained in the reference cells 25. Also to be capable of being used for various types of noise distributions, or for situations where a plurality of targets or jammer and further clutter are contained therein, a size of hardware for the target detecting section becomes larger.

The present invention was made to solve the problem described above, and it is still further another object of the present invention to minimize a size of hardware in a target detecting section.

A radar signal processing apparatus according to the present invention comprises a noise distribution measurement system for measuring a noise distribution and an adaptive type target detecting circuit for selecting and executing a target detection system most suited to a result of the measurement.

The radar signal processing apparatus according to the present invention comprises a noise distribution measuring circuit as a noise distribution measurement system, a previously prepared template of a noise distribution, and a pattern matching circuit for matching a noise distribution to the template.

The radar signal processing apparatus according to the present invention comprises an edge detecting circuit for detecting clutter edges as a noise distribution measurement system using the pattern matching circuit.

The radar signal processing apparatus according to the present invention comprises a noise level change detecting circuit for detecting an abrupt change of a noise level in reference cells in addition to the noise distribution measurement system.

The radar signal processing apparatus according to the present invention comprises a means for selecting and executing the most suited CFAR by receiving an output from the pattern matching circuit or neural network, an output from the edge detecting circuit as well as from the noise level change detecting circuit, and further an external control signal.

The radar signal processing apparatus according to the present invention comprises a noise distribution measuring circuit as a noise distribution measurement system, a neural network for deciding a noise distribution, and tutorial data by which the neural network previously learns.

The radar signal processing apparatus according to the present invention comprises an edge detecting circuit for detecting clutter edges as a noise distribution measurement system using the neural network.

A radar signal processing apparatus according to the present invention comprises a noise distribution measurement mode system for measuring a noise distribution in a noise distribution measurement mode, and a radar mode system comprising an adaptive type target detecting circuit for selecting and executing a target detection system most suited to a result of the measurement of a noise distribution in a normal radar searching or tracking mode.

The radar signal processing apparatus according to the present invention comprises, as a noise distribution measurement mode system, a noise distribution measuring circuit, a previously prepared template for a noise distribution, a pattern matching circuit for matching a noise distribution to the template, and a memory.

The radar signal processing apparatus according to the present invention comprises an edge detecting circuit for detecting clutter edges as a noise distribution measurement mode system using the pattern matching circuit.

The radar signal processing apparatus according to the present invention comprises a noise level change detecting circuit for detecting an abrupt change of a noise level in addition to the noise distribution measurement mode system.

The radar signal processing apparatus according to the present invention comprises a means for selecting and executing the most suited CFAR by receiving a memory output from the noise distribution measurement mode system and an output from the noise level change detecting circuit, and further an external control signal.

The radar signal processing apparatus according to the present invention comprises, as a noise distribution measurement system, a noise distribution measuring circuit, a neural network for deciding a noise distribution, tutorial data by which the neural network previously learns, and a memory.

The radar signal processing apparatus according to the present invention comprises an edge detecting circuit for detecting clutter edges as a noise distribution measurement mode system using the neural network.

A radar signal processing apparatus according to the present invention comprises a means for sharing hardware with various types of CFAR in the adaptive type target detecting circuit.

Other objects and features of this invention will become understood from the following description with reference to the accompanying drawings.

BRIEF DESCRIPTION OF THE DRAWINGS

FIG. 4A is a view showing a case where no clutter edge is contained in the signal, and FIG. 4B is a view showing a case where clutter edges are contained therein;

FIG. 5A is a view showing a case where a plurality of targets and jammer are not contained in the signal and FIG. 5B is a view showing a case where a plurality of targets and jammer are contained therein;

DESCRIPTION OF THE PREFERRED EMBODIMENTS

Figure 1:
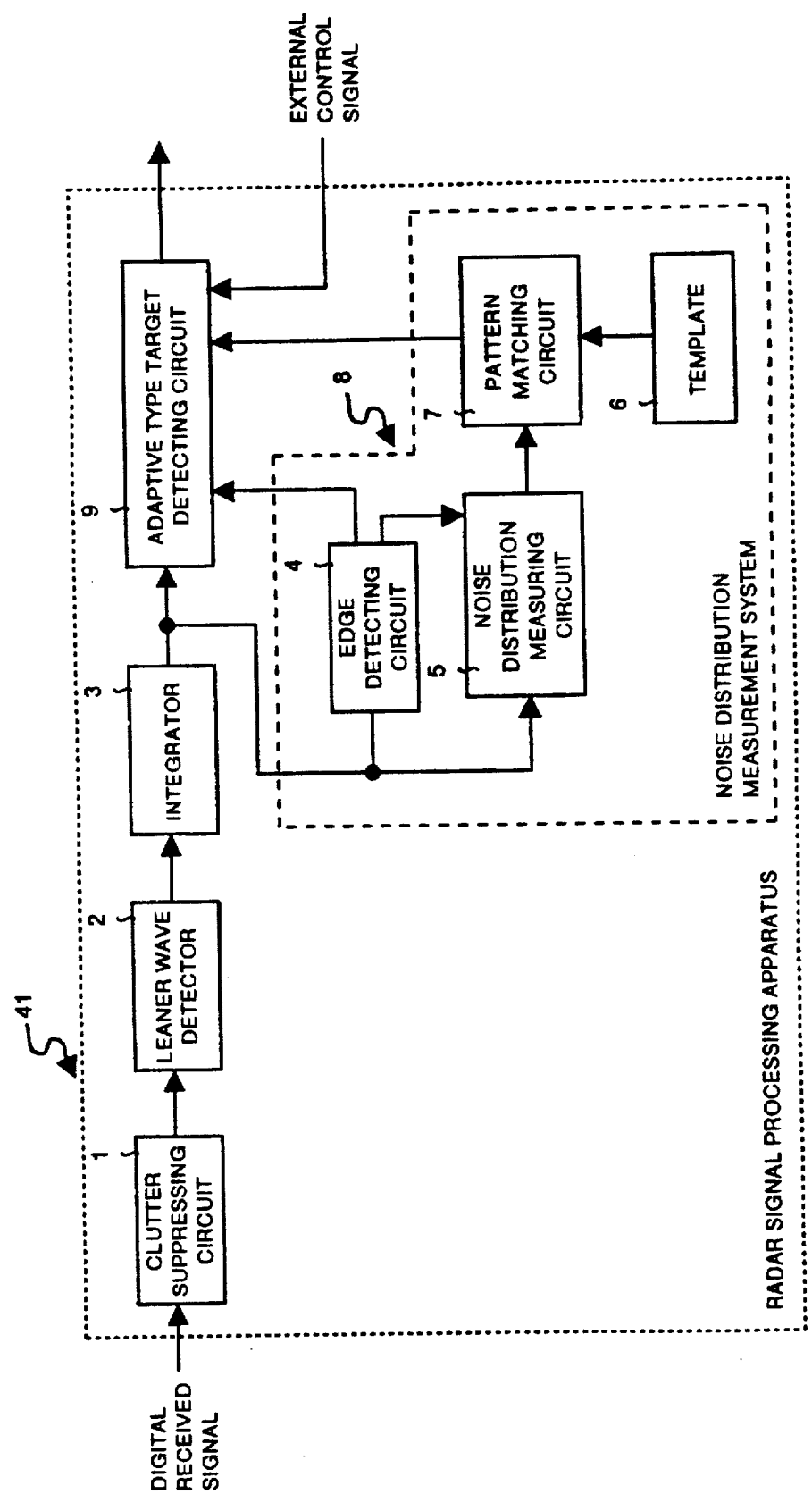
FIG. 1 is a block diagram showing Embodiment 1 of a radar signal processing apparatus according to the present invention.

FIG. 1 is a general block diagram showing Embodiment 1 of the present invention. In the figure, designated at the reference numeral 1 is a clutter suppressing circuit, at 2 a linear wave detector, at 3 an integrator, at 4 an edge detecting circuit, at 5 a noise distribution measuring circuit, at 6 a template, at 7 a pattern matching circuit, at 8 a noise distribution measurement system comprising the edge detecting circuit 4, noise distribution measuring circuit 5, template 6, and pattern matching circuit 7, and at 9 an adaptive type target detecting circuit.

Figure 2:
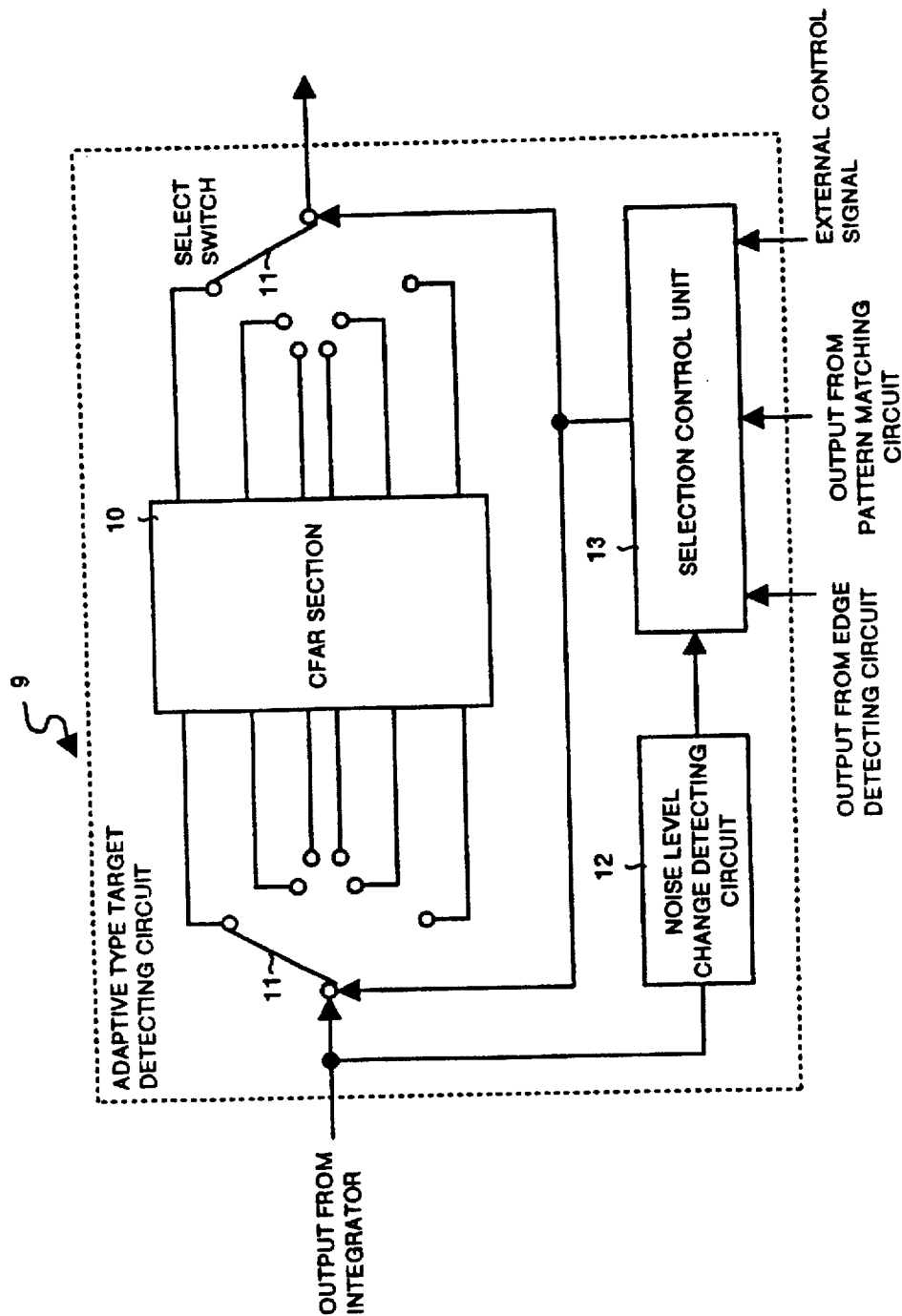
FIG. 2 is a block diagram showing an adaptive type target detecting circuit according to Embodiment 1 of the present invention.

FIG. 2 shows a block diagram of inside of the adaptive type target detecting circuit 9. In the figure, designated at the reference numeral 10 is a CFAR section, at 11 a select switch for selecting various types of CFAR circuits in the CFAR section 10, at 12 a noise level change detecting circuit, and at 13 a selection control unit for controlling the select switch 11.

Figure 3:
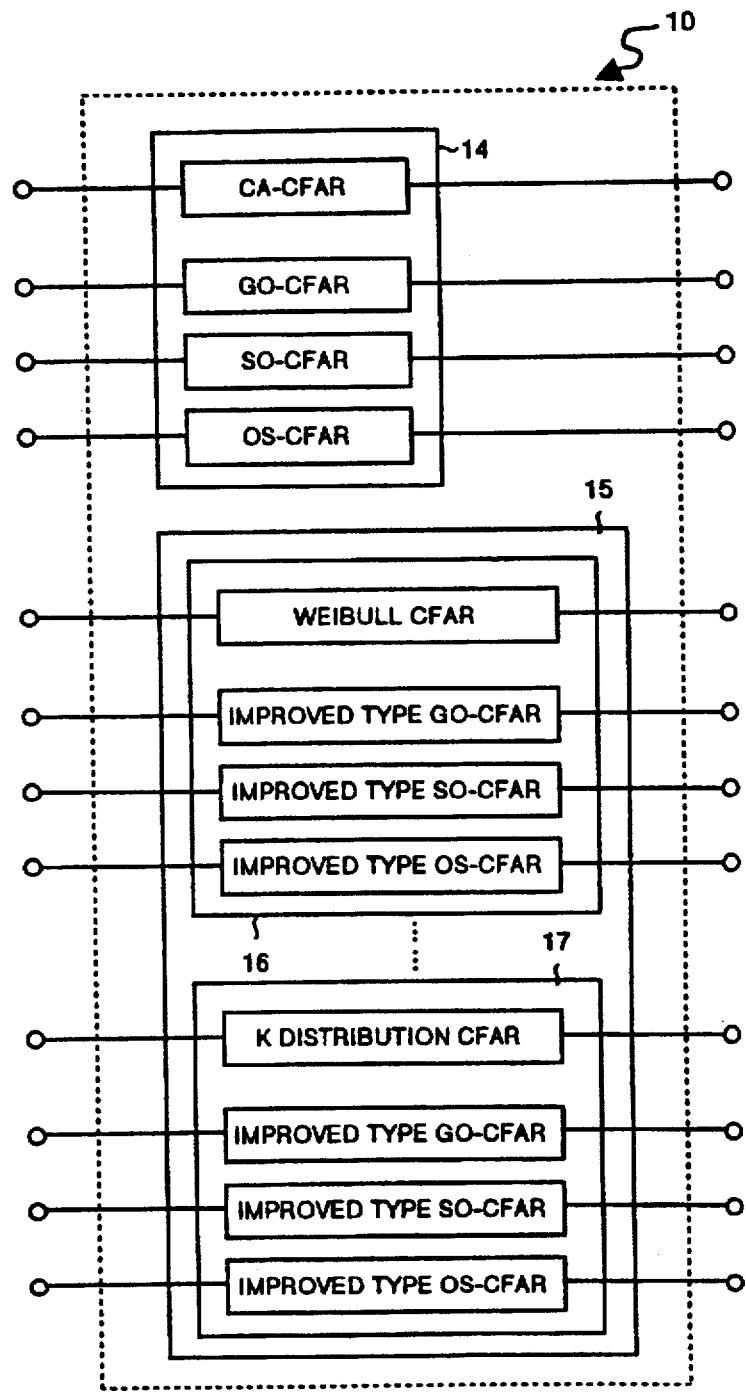
FIG. 3 is a block diagram showing a CFAR section according to Embodiment 1 of the present invention.

FIG. 3 shows a block diagram of inside of the CFAR section 10. In the figure, designated at the reference numeral 14 are CFARs according to the Rayleigh distribution, and at 15 CFARs according to distributions other than the Rayleigh distribution. The reference numerals 16 and 17 indicate CFARs according to the Weibull distribution as well as to the K distribution as examples of CFAR according to distributions other than the Rayleigh distribution. As an example of the CFARs 14 according to the Rayleigh distribution, FIG. 3 shows CA-CFAR, GO-CFAR, SO-CFAR, and OS-CFAR. Also as an example of the CFAR 16 according to the Weibull distribution, FIG. 3 shows the Weibull CFAR, improved type GO-CFAR, improved type SO-CFAR, and improved type OS-CFAR. Similarly, as an example of the CFAR 17 according to the K distribution, FIG. 3 shows the K distribution CFAR, improved type GO-CFAR, improved type SO-CFAR, and improved type OS-CFAR. The improved type GO-CFAR according to the Weibull distribution in the CFAR 16 indicates herein the fact that a threshold level is set based on the premise that an operating principle, circuit construction, circuit operation are the same as those in an general GO-CFAR, but a distribution of noises is based on the Weibull distribution, and similar to other improved types of CFAR.

Next, a description is made for the operations thereof. Like in a case of the conventional type of radar system shown in FIG. 10, a signal received by an antenna 36 is inputted into the radar signal processing apparatus 41 through the transmitting/receiving select switch 37, receiver 39, and A/D converter 40. As for the signal received by the radar signal processing apparatus 41, at first, a clutter which is a reflected wave from the ground, mountains, sea, rain, and clouds or the like is removed therefrom by the clutter suppressing circuit 1. An amplitude of the signal from which the clutter has been removed is detected by the linear wave detector 2, the signal is subjected to a processing for improving the S/N by the integrator 3, and inputted into the adaptive type target detecting circuit 9 for detecting a target. And at the same time, the signal is inputted into the noise distribution measurement system 8.

As for the signal received by the noise distribution measurement system 8, at first, sampling of data is executed for a specified period of time and an ensemble average for a distribution is calculated in the noise distribution measuring circuit 5. Then in the pattern matching circuit 7, a distribution of noises is decided by matching the distribution obtained by the noise distribution measuring circuit 5 to previously prepared information for a distribution, and outputted to the adaptive type target detecting circuit 9. Herein the previously prepared information for a distribution is specified to a template 6. Types of distributions prepared in the template 6 correspond to types of CFARs in the adaptive type target detecting circuit 9.

A selection control unit 13 in the adaptive type target detecting circuit 9 receives a result of determination of the noise distribution by the noise distribution measurement system 8 and controls the select switch 11 so that a CFAR system adaptive to the result in the CFAR section 10 is selected. For instance, if the noise distribution measurement system 8 determines that the noise distribution is the Rayleigh distribution, the selection control unit 13 outputs a control signal to the select switch 11 for selecting CFAR 14 according to the Rayleigh distribution in the CFAR section 10 in FIG. 3. The select switch 11 having received the outputted signal is switched to any of the CFARs 14 according to the Rayleigh distribution and a target is detected according to the selected CFAR system. Similarly, if the noise distribution measurement system 8 determines that the noise distribution is the Weibull distribution, the selection control unit 13 outputs a control signal for selecting CFAR 16 according to the Weibull distribution in the CFAR section 10. The select switch 11 having received the outputted signal is switched to any of the CFARs 16 according to the Weibull distribution and a target is detected according to the selected CFAR system.

Figure 4A:
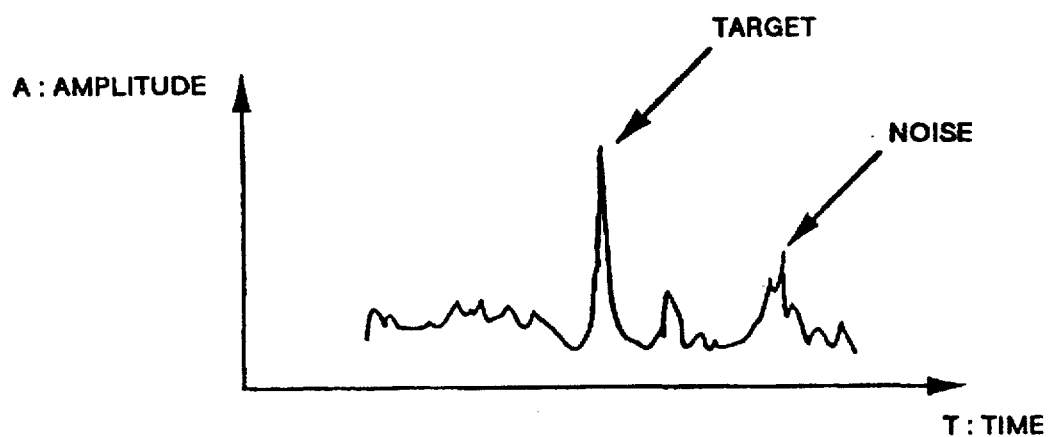
FIGS. 4A and 4B are views showing a pattern of a signal inputted into an edge detecting circuit depending on whether any clutter edges are therein or not.
Figure 4B:
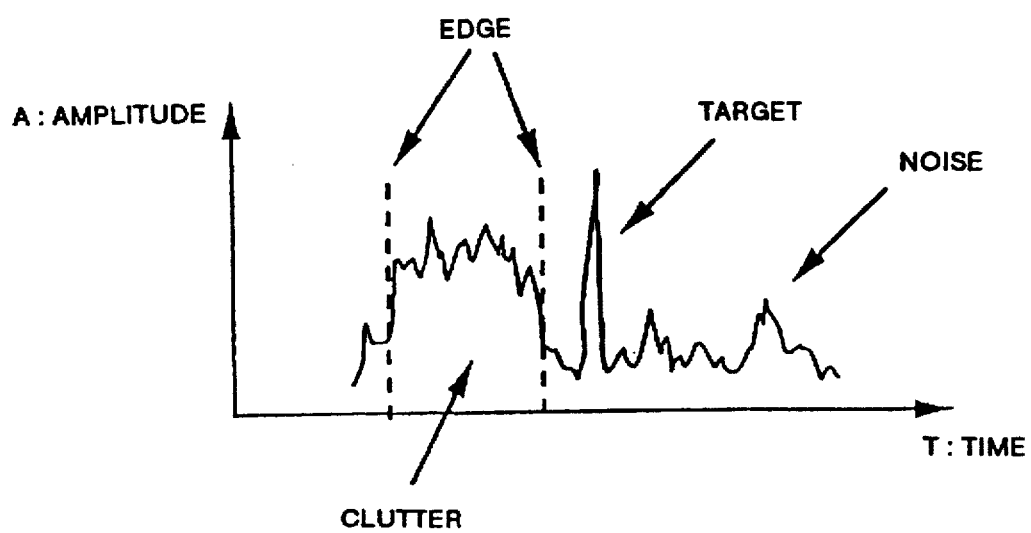

On the other hand, an output from the integrator 3 is also inputted into the edge detecting circuit 4. FIGS. 4A and 4B show a waveform of the signal received by the edge detecting circuit 4. In the figure, the X-axis indicates time T, and the Y-axis indicates a signal amplitude A. FIG. 4A indicates a pattern of a received signal in a case where any clutter is not contained in the received signal except a target signal and a noise therein or in a case where a clutter is sufficiently suppressed by the clutter suppressing circuit 1 even if the clutter is contained in the received signal. In a case, however, where a clutter is not sufficiently suppressed so that some of the clutter is still left therein, or in a case where a clutter which is out of objects to be suppressed by the clutter suppressing circuit 1 is contained therein, a pattern of the received signal becomes similar to that in FIG. 4B. If the signal as shown in FIG. 4B is subjected to a processing of, for instance, CA-CFAR, the threshold level is raised, so that there may be generated a case where the target can not be detected. In order to correspond to the case described above, the edge detecting circuit 4 tries to detect any clutter edges from discontinuity of signals in a noise area, namely an abrupt change of the signals, and has the noise distribution measuring circuit 5 calculate an ensemble average excluding the clutter data if the edges are contained therein. The edge detecting circuit 4 also outputs a control signal to the selection control unit 13 in the adaptive type target detecting circuit 9 so that GO-CFAR (improved type GO-CFAR), or SO-CFAR (improved SO-CFAR) in the noise distribution according to the determination by the noise distribution measurement system 8 will be selected.

Figure 5A:
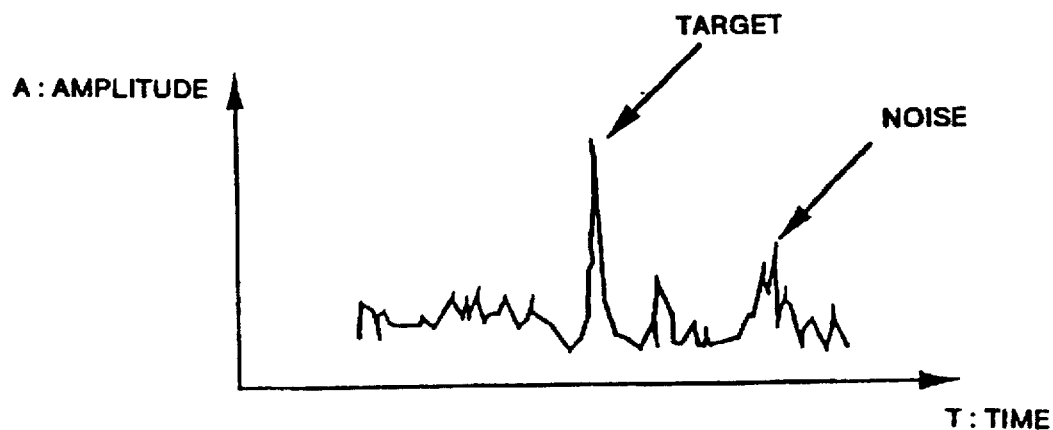
FIGS. 5A and 5B are views showing a pattern of a signal inputted into a noise level change detecting circuit depending on whether any of a plurality of targets and jammer are therein or not.
Figure 5B:
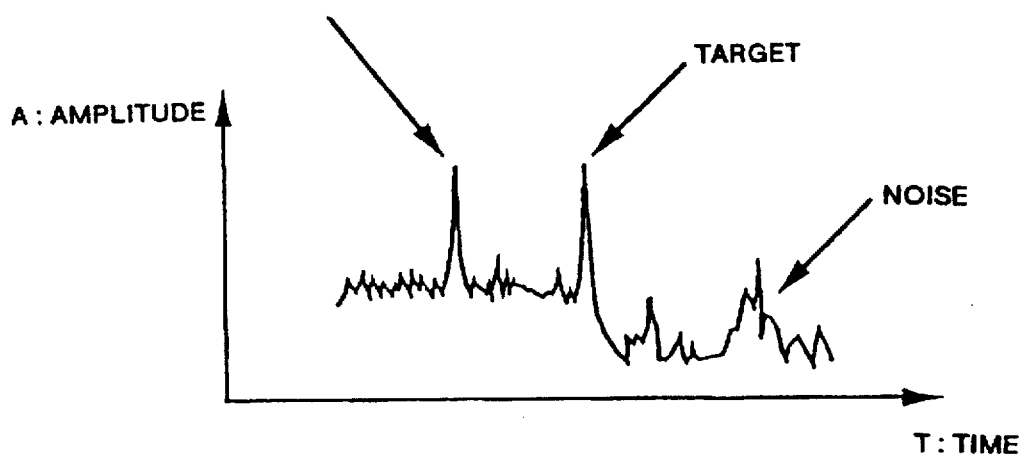

On the other hand, an output from the integrator 3 is also inputted into the noise level change detecting circuit 12. FIG. 5 shows a wave form of the signal received by the noise level change detecting circuit 12. In the figure, the X-axis indicates time T, and the Y-axis indicates a signal amplitude A. FIG. 5A shows a pattern of a received signal in a case where any other targets or jammer are not contained in the signal having only a single target and a noise. However, in a case where a plurality of targets are close to the target or a case where any jammer is contained therein, the received signal becomes the pattern as shown in FIG. 5B. If the received signal is subjected to a processing of, for instance, CA-CFAR, the threshold level is raised so that there may be generated a case where the target can not be detected. In order to respond to the case described above, the noise level change detecting circuit 12 detects an average value of data in the reference cells 25, namely a change of estimate values of the threshold level, and if the change is larger than the specified value, it is assumed that some other targets or jammer are contained in the reference cells 25, and the noise level change detecting circuit 12 outputs a control signal to the selection control unit 13 in the adaptive type target detecting circuit so that OS-CFAR (improved type OS-CFAR) in the noise distribution according to the determination by the noise distribution measurement system 8 will be selected.

It should be noted that the selection control unit 13 also receives a control signal inputted from outside, and can control the select switch 11 so that a CFAR system in the CFAR section 10 will be independently selected and executed with an external control signal prior to a result of the determination of a noise distribution by the pattern matching circuit 7, to a result of determination by the edge detecting circuit 4 whether clutter edges are contained in the signal or not, and to a result of the determination by the noise level change detecting circuit 12 whether some other targets or jammer exist therein or not. For instance, it is assumed that a result of the determination of a noise distribution by the noise distribution measurement system 8 is determined as the Weibull distribution and some other targets are detected by the noise level change detecting circuit 12. However, if it is required for an operation to execute CFAR processing following the Rayleigh distribution for system operation, the selection control unit 13 receives an external control signal for selecting the Rayleigh distribution. With this feature the selection control unit 13 outputs a control signal so that not improved type of OS-CFAR of the CFARs 16 according to the Weibull distribution, but OS-CFAR of the CFARs 14 according to the Rayleigh distribution will be selected and executed.

Figure 6:
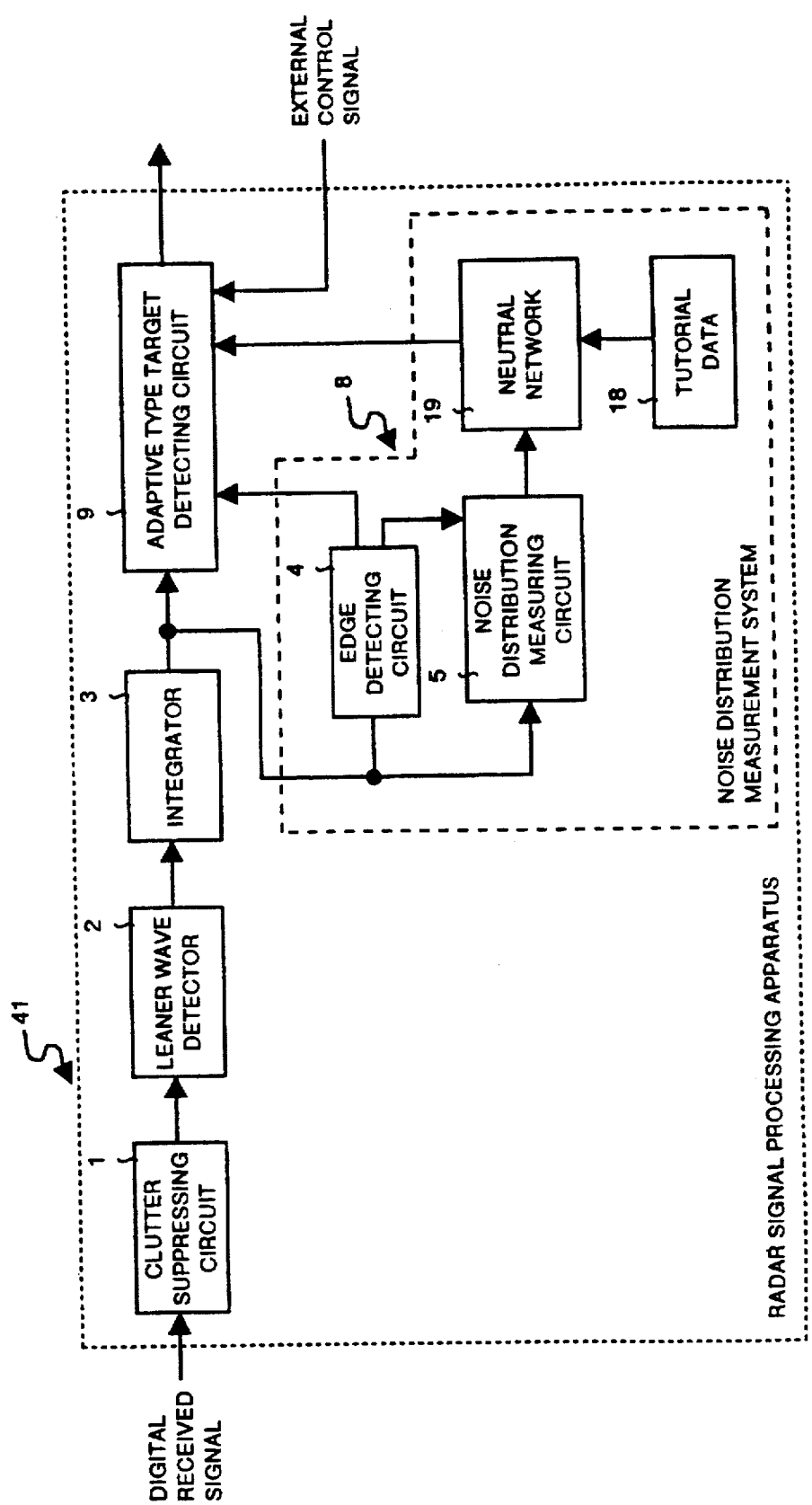
FIG. 6 is a block diagram showing Embodiment 2 of the radar signal processing apparatus according to the present invention.

FIG. 6 is a general block diagram showing Embodiment 2 of the present invention. In the figure, designated at the reference numeral 1 is a clutter suppressing circuit, at 2 a linear wave detector, at 3 an integrator, at 4 an edge detecting circuit, at 5 a noise distribution measuring circuit, at 18 tutorial data, at 19 a neural network, at 8 a noise distribution measurement system comprising the edge detecting circuit 4, noise distribution measuring circuit 5, tutorial data 18, and neural network 19, and at 9 an adaptive type target detecting circuit.

Configuration of the adaptive type target detecting circuit 9 and configuration of the CFAR section 10 in the adaptive type target detecting circuit 9 are the same as those in Embodiment 1, and are shown in FIG. 2 and FIG. 3 respectively.

Figure 10:
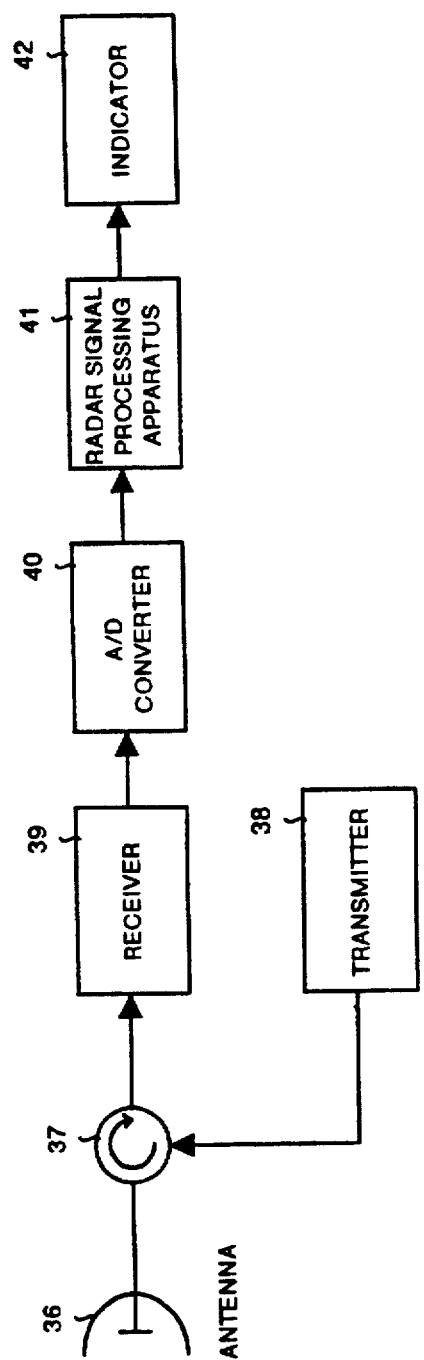
FIG. 10 is a basic block diagram showing a radar system using the radar signal processing apparatus.
Figure 11:
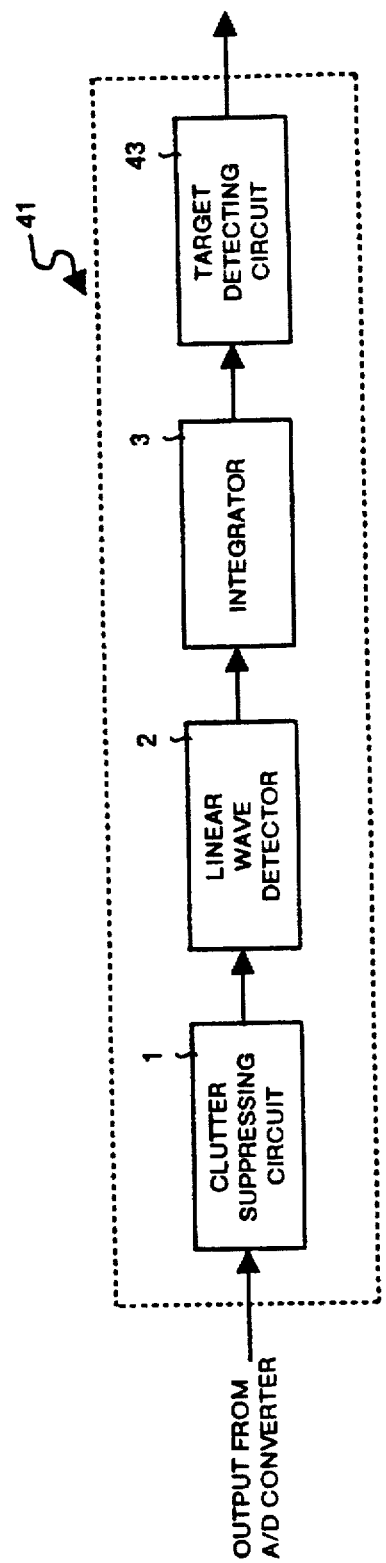
FIG. 11 is a basic block diagram showing a conventional type of radar signal processing apparatus.

Next, a description is made for the operations thereof. Similar to the conventional type of radar system as shown in FIG. 10, a signal received by an antenna 36 is inputted into the radar signal processing apparatus 41 through the transmitting/receiving select switch 37, receiver 39, and A/D converter 40. As for the signal received by the radar signal processing apparatus 41, at first, a clutter which is a reflected wave from the ground, mountains, sea, rain, and clouds or the like is removed therefrom by the clutter suppressing circuit 1. An amplitude of the signal from which the clutter has been removed is detected by the linear wave detector 2, the signal is subjected to a processing for improving the S/N by the integrator 3, and inputted into the adaptive type target detecting circuit 9 for detecting a target. And at the same time, the signal is inputted into the noise distribution measurement system 8.

As for the signal received by the noise distribution measurement system 8, at first, sampling of data is executed for a specified period of time and an ensemble average for the distribution is calculated in the noise distribution measuring circuit 5. Then as for the distribution obtained by the noise distribution measuring circuit 5, a distribution of noises is determined by using the neural network 19 which has previously learned by the tutorial data 18, and the determined distribution is outputted to the adaptive type target detecting circuit 9. The tutorial data 18 utilized for the neural network 19 to previously learn corresponds to each type of the CFARs in the adaptive type target detecting circuit 9.

Operations in the adaptive type target detecting circuit 9 are the same as those in Embodiment 1, and the selection control unit 13 receives a result of determination of a noise distribution by the neural network 19 and controls the select switch 11 so that a CFAR system adaptive to the result in the CFAR section 10 will be selected and executed.

On the other hand, an output from the integrator 3 is also inputted into the edge detecting circuit 4. The operations of the edge detecting circuit 4 are the same as those described in Embodiment 1 with reference to FIG. 4.

On the other hand, an output from the integrator 3 is also inputted into the noise level change detecting circuit 12. The operations of the noise level change detecting circuit 12 are the same as those described in Embodiment 1 with reference to FIG. 5.

It should be noted that the selection control unit 13 also receives a control signal inputted from outside like in Embodiment 1, and can control the select switch 11 so that a CFAR system in the CFAR section 10 will independently be selected and executed with an external control signal prior to a result of the determination of a noise distribution by the neural network 19, to a result of the determination by the edge detecting circuit 4 whether clutter edges are contained in the signal or not, and to a result of the determination by the noise level change detecting circuit 12 whether any other targets or jammer are contained therein or not.

Figure 7:
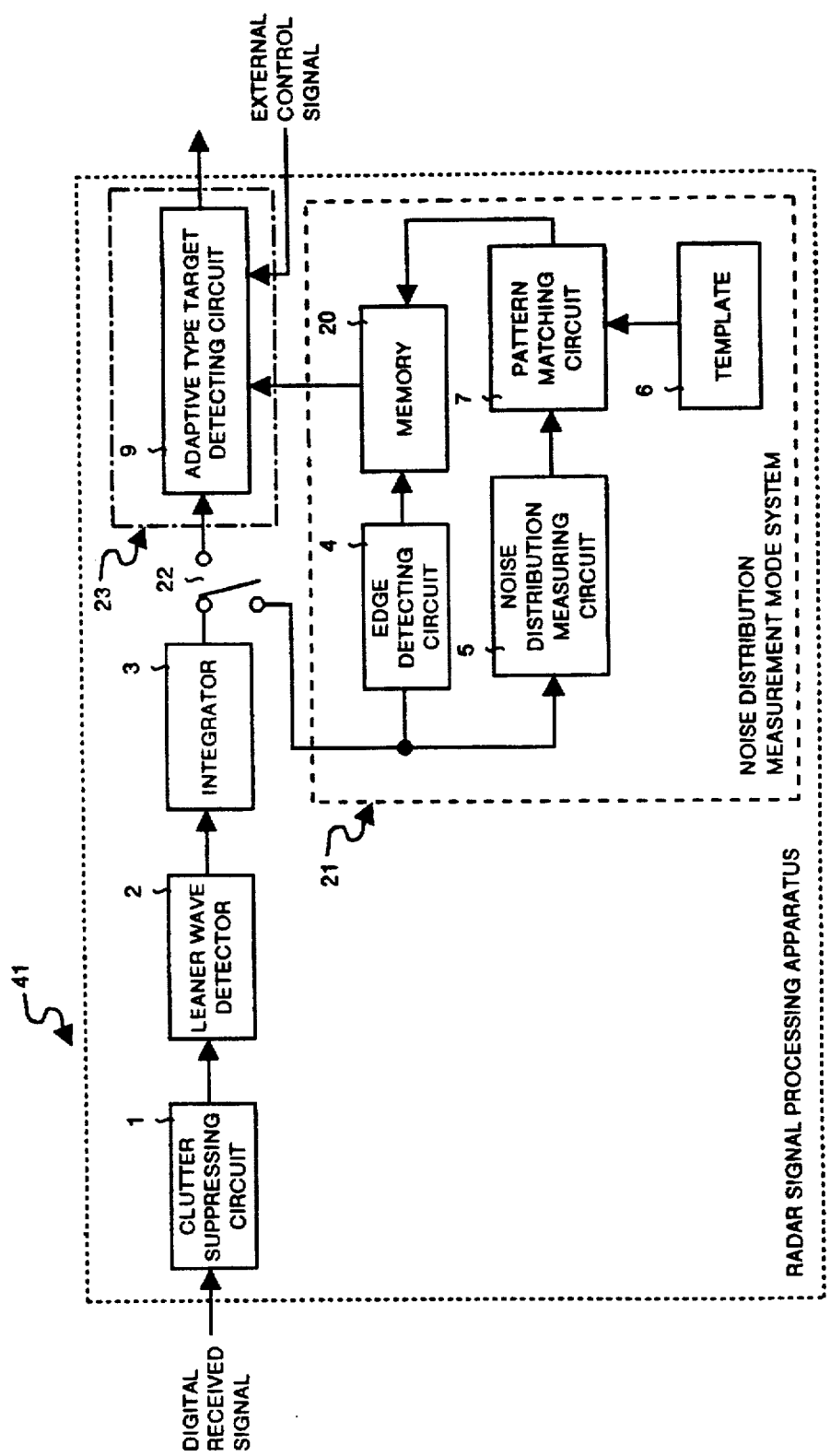
FIG. 7 is a block diagram showing Embodiment 3 of the radar signal processing apparatus according to the present invention.

FIG. 7 is a general block diagram showing Embodiment 3 of the present invention. In the figure, designated at the reference numeral 1 is a clutter suppressing circuit, at 2 a linear wave detector, at 3 an integrator, at 4 an edge detecting circuit, at 5 a noise distribution measuring circuit, at 6 a template, at 7 a pattern matching circuit, at 20 a memory, at 21 a noise distribution measurement mode system comprising the edge detecting circuit 4, noise distribution measuring circuit 5, template 6, pattern matching circuit 7, and memory 20, at 9 an adaptive type target detecting circuit, at 23 a radar mode system comprising the adaptive type target detecting circuit 9, at 22 a mode select switch for switching an output from the integrator 3 to either the noise distribution measurement mode system 21 or the radar mode system 23 according to an operation mode for the radar.

Configuration of the adaptive type target detecting circuit 9 and configuration of the CFAR section 10 in the adaptive type target detecting circuit 9 are the same as those in Embodiment 1, and are shown in FIG. 2 and FIG. 3 respectively.

Next description is made for the operations thereof. The apparatus operates in a mode for measurement of a noise distribution, in addition to the normal radar mode for searching or tracking. In the noise distribution measurement mode, at first, similar to the conventional type of radar system as shown in FIG. 10, a signal received by an antenna 36 is inputted into the radar signal processing apparatus 41 through the transmitting/receiving select switch 37, receiver 39, and A/D converter 40. As for the signal received by the radar signal processing apparatus 41, at first, a clutter which is a reflected wave from the ground, mountains, sea, rain, and clouds or the like is removed therefrom by the clutter suppressing circuit 1. An amplitude of the signal from which the clutter has been removed is detected by the linear wave detector 2, the signal is subjected to a processing for improving the S/N by the integrator 3, and inputted into the noise distribution measurement mode system 21 by switching a mode with the mode select switch 22.

As for the signal received by the noise distribution measurement mode system 21, at first, sampling of data is executed for a specified period of time and an ensemble average for a distribution is calculated in the noise distribution measuring circuit 5. Then in the pattern matching circuit 7, a distribution of noises is decided by matching the distribution obtained by the noise distribution measuring circuit 5 to previously prepared information for a distribution, and a result of the decision is stored in the memory 20. Herein the previously prepared information for a distribution is specified to a template 6. Types of distributions prepared in the template 6 correspond to types of CFARs in the adaptive type target detecting circuit 9.

On the other hand, an output from the integrator 3 is also inputted into the edge detecting circuit 4. The operations of the edge detecting circuit 4 are the same as those described in Embodiment 1 with reference to FIG. 4, and a result of the operations is stored in the memory 20.

Then the operation mode of the apparatus is switched from the noise distribution measurement mode to the normal radar searching or tracking mode. In the normal searching or tracking mode, a signal received by an antenna 36 is inputted into the radar signal processing apparatus 41 through the transmitting/receiving select switch 37, receiver 39, and A/D converter 40. As for the signal received by the radar signal processing apparatus 41, at first, a clutter which is a reflected wave from the ground, mountains, sea, rain, and clouds or the like is removed therefrom by the clutter suppressing circuit 1. An amplitude of the signal from which the clutter has been removed is detected by the linear wave detector 2, the signal is subjected to a processing for improving the S/N by the integrator 3, and inputted into the adaptive type target detecting circuit 9 for target detection by switching a mode with the mode select switch 22.

Herein, depending on a result of the determination of the noise distribution as well as on a result of the determination as to whether clutter edges are contained in the signal or not each stored in the memory 20 in the noise distribution measurement mode, the selection control unit 13 in the adaptive type target detecting circuit 9 controls the select switch 11 so that a CFAR system adaptive to the result in the CFAR section 10 will be selected. For instance, if the noise distribution measurement mode system 21 determines that the noise distribution is the Rayleigh distribution, and also the edge detecting circuit 4 determines that clutter edges are contained in the signal, the select control unit 13 outputs a control signal for selecting GO-CFAR or SO-SFAR in the CFARs 14 according to the Rayleigh distribution in the CFAR section 10 in FIG. 2, and the select switch 11 is switched to either GO-CFAR or SO-CFAR in the CFARs 14 according to the Rayleigh distribution, whereby a target is detected. Similarly, if the noise distribution measurement mode system 21 determines that the noise distribution is the Weibull distribution, and also the edge detecting circuit 4 determines that no clutter edge is contained in the signal, the selection control unit 13 outputs a control signal for selecting the Weibull CFAR in the CFARs 16 according to the Weibull distribution in the CFAR section 10 in FIG. 2, and the select switch 11 is switched to the Weibull CFAR, whereby a target is detected.

On the other hand, an output from the integrator 3 is also inputted into the noise level change detecting circuit 12. The operations of the noise level change detecting circuit 12 are the same as those described in Embodiment 1 with reference to FIG. 5.

It should be noted that the selection control unit 13 also receives a control signal inputted from outside like in Embodiment 1, and can control the select switch 11 so that a CFAR system in the CFAR section 10 will independently be selected and executed with an external control signal prior to a result of the determination of a noise distribution, as well as to a result of the determination whether clutter edges are contained in the signal or not each stored in the memory 20 in the noise distribution measurement mode, and to a result of the determination by the noise level change detecting circuit 12 whether any other targets or jammer are contained therein or not in the noise distribution measurement mode.

Figure 8:
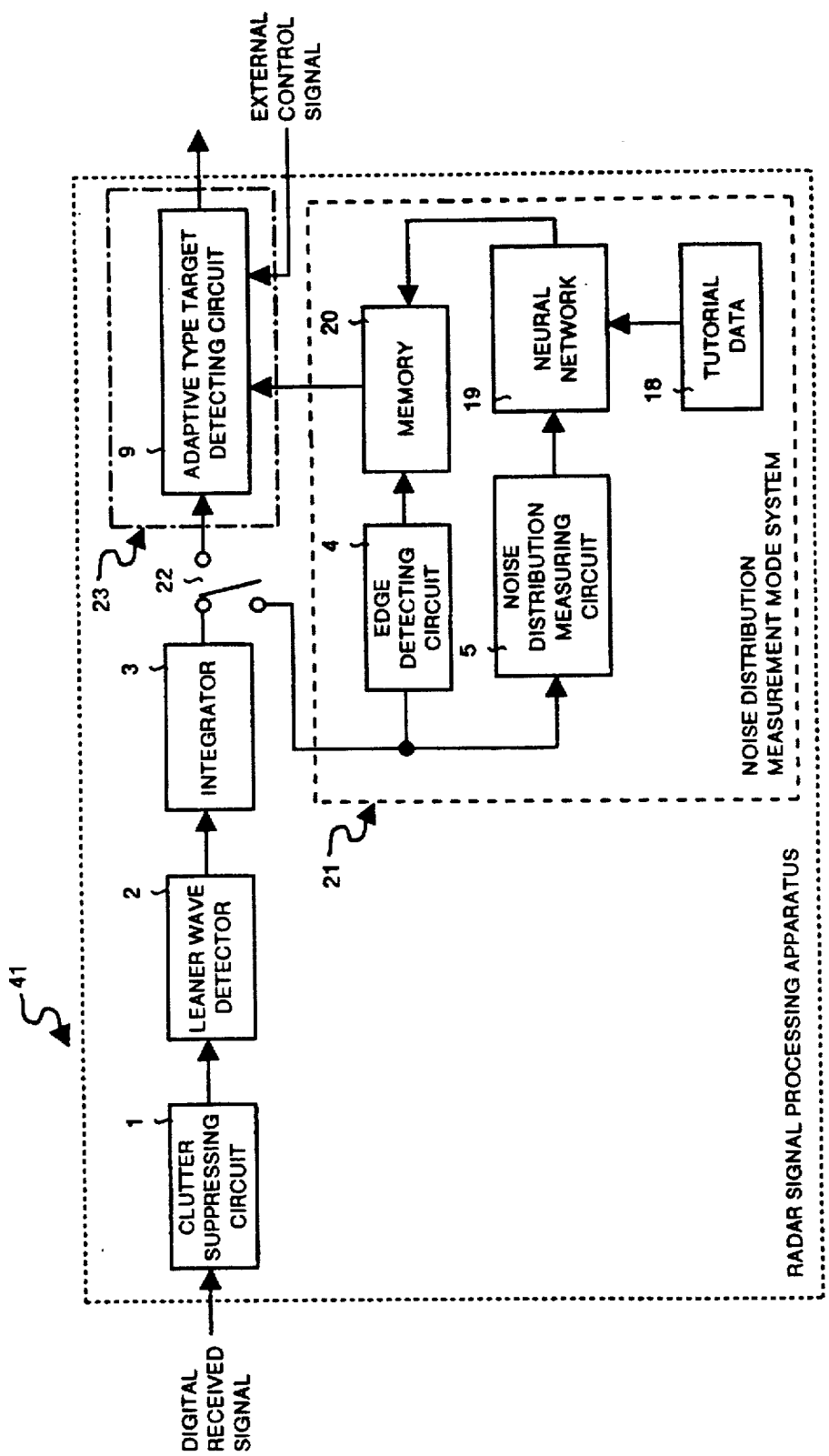
FIG. 8 is a block diagram showing Embodiment 4 of the radar signal processing apparatus according to the present invention.

FIG. 8 is a general block diagram showing Embodiment 4 of the present invention. In the figure, designated at the reference numeral 1 is a clutter suppressing circuit, at 2 a linear wave detector, at 3 an integrator, at 4 an edge detecting circuit, at 5 a noise distribution measuring circuit, at 18 tutorial data, at 19 a neural network, at 20 a memory, at 21 a noise distribution measurement mode system comprising the edge detecting circuit 4, noise distribution measuring circuit 5, tutorial data 18, neural network 19, and memory 20, at 9 an adaptive type target detecting circuit, at 23 a radar mode system comprising the adaptive type target detecting circuit 9, at 22 a mode select switch for switching an output from the integrator 3 to either the noise distribution measurement mode system 21 or the radar mode system 23 according to an operation mode for the radar.

Configuration of the adaptive type target detecting circuit 9 and configuration of the CFAR section 10 in the adaptive type target detecting circuit 9 are the same as those in Embodiment 1, and are shown in FIG. 2 and FIG. 3, respectively.

Next, description is made for the operations thereof. The apparatus operates in a mode for measurement of a noise distribution, in addition to the normal radar mode for searching or tracking. In the noise distribution measurement mode, similar to the conventional type of radar system as shown in FIG. 10, a signal received by an antenna 36 is inputted into the radar signal processing apparatus 41 through the transmitting/receiving select switch 37, receiver 39, and A/D converter 40. As for the signal received by the radar signal processing apparatus 41, at first, a clutter which is a reflected wave from the ground, mountains, sea, rain, and clouds or the like is removed therefrom by the clutter suppressing circuit 1. An amplitude of the signal from which the clutter has been removed is detected by the linear wave detector 2, the signal is subjected to a processing for improving the S/N by the integrator 3, and inputted into the noise distribution measurement mode system 21 by switching a mode with the mode select switch 22.

As for the signal received by the noise distribution measurement mode system 21, at first, sampling of data is executed for a specified period of time and an ensemble average for a distribution is calculated in the noise distribution measuring circuit 5. Then as for the distribution obtained by the noise distribution measuring circuit 5, a distribution of noises is determined by using the neural network 19 which has previously learned by the tutorial data 18, and a result of the decision is stored in the memory 20. The tutorial data 18 utilized for the neural network 19 to previously learn corresponds to types of CFARs in the adaptive type target detecting circuit 9.

On the other hand, an output from the integrator 3 is also inputted into the edge detecting circuit 4. The operations of the edge detecting circuit 4 are the same as those described in Embodiment 1 with reference to FIG. 4, and a result of the operations is stored in the memory 20.

Then the operation mode of the apparatus is switched from the noise distribution measurement mode to the normal radar searching or tracking mode. In the normal searching or tracking mode, a signal received by an antenna 36 is also inputted into the radar signal processing apparatus 41 through the transmitting/receiving select switch 37, receiver 39, and A/D converter 40. As for the signal received by the radar signal processing apparatus 41, at first, a clutter which is a reflected wave from the ground, mountains, sea, rain, and clouds or the like is removed therefrom by the clutter suppressing circuit 1. An amplitude of the signal from which the clutter has been removed is detected by the linear wave detector 2, the signal is subjected to a processing for improving the S/N by the integrator 3, and inputted into the adaptive type target detecting circuit 9 for target detection by switching a mode with the mode select switch 22.

Operations in the adaptive type target detecting circuit 9 are the same as those in Embodiment 3, and the selection control unit 13 receives a result of the determination of a noise distribution and a result of the determination whether clutter edges are contained in the signal or not by the noise distribution measurement mode system 21, and controls the select switch 11 so that a CFAR system adaptive to the result in the CFAR section 10 will be selected and executed.

On the other hand, an output from the integrator 3 is also inputted into the noise level change detecting circuit 12. The operations of the noise level change detecting circuit 12 are the same as those described in Embodiment 1 with reference to FIG. 5.

It should be noted that the selection control unit 13 also receives a control signal inputted from outside like in Embodiment 3, and can control the select switch 11 so that a CFAR system in the CFAR section 10 will independently be selected and executed with an external control signal prior to a result of the determination of a noise distribution, as well as to a result of the determination whether clutter edges are contained in the signal or not each stored in the memory 20 in the noise distribution measurement mode, and to a result of the determination by the noise level change detecting circuit 12 whether any other targets or jammer are contained therein or not.

Figure 9:
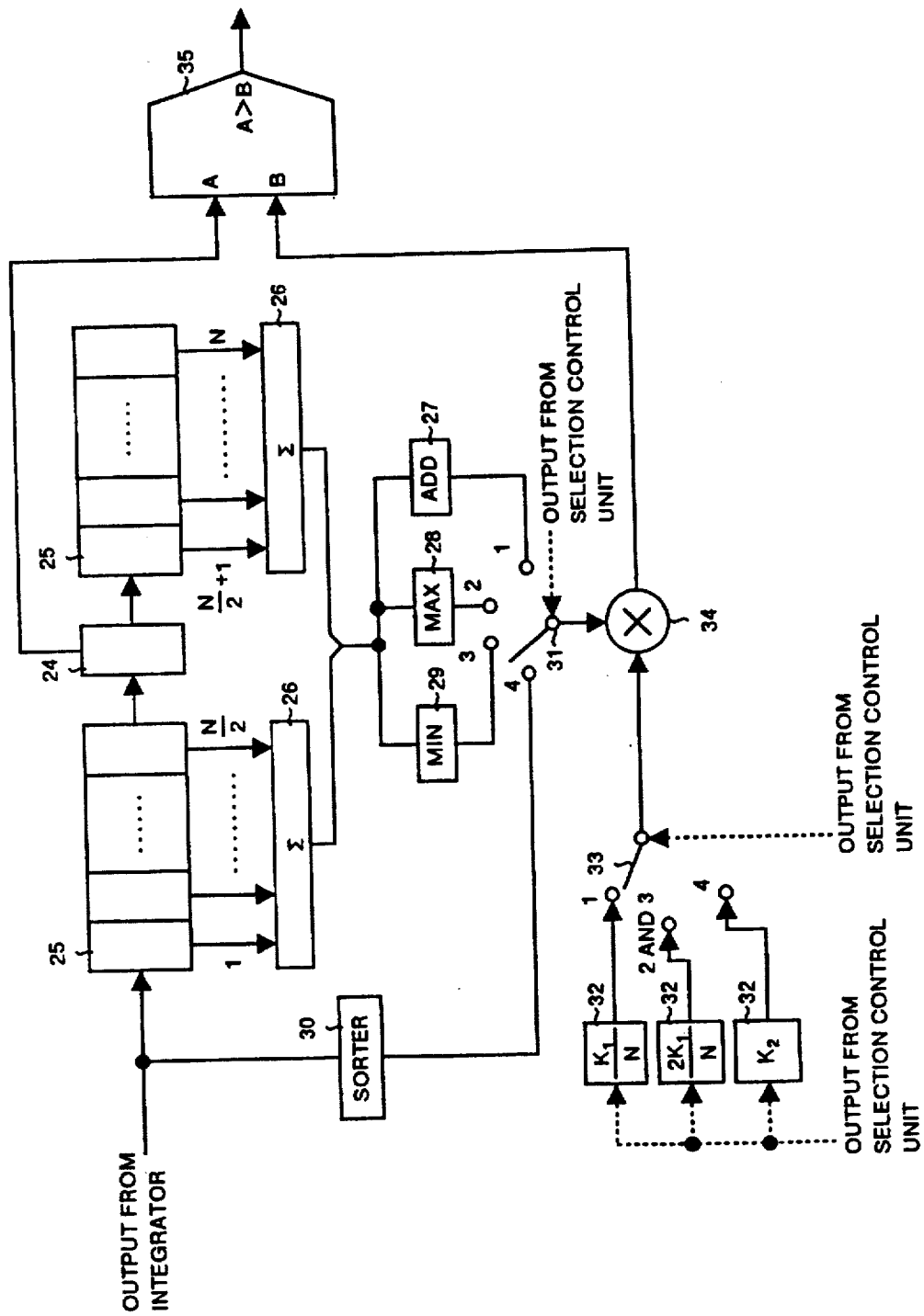
FIG. 9 is a block diagram showing a CFAR circuit in an adaptive type target detecting circuit according to Embodiment 5 of the radar signal processing apparatus of the present invention.

FIG. 9 is a general block diagram showing Embodiment 5 of the present invention. In the figure, designated at the reference numeral 24 a remark cell, at 25 reference cells, at 26 an adder, at 27 a summing device, at 28 a maximum value detector, at 29 a minimum value detector, at 30 a sorter, at 31 a switch-1, at 32 a threshold factor memory, at 33 a switch-2, at 34 a multiplier, and at 35 a comparator.

Figure 12:
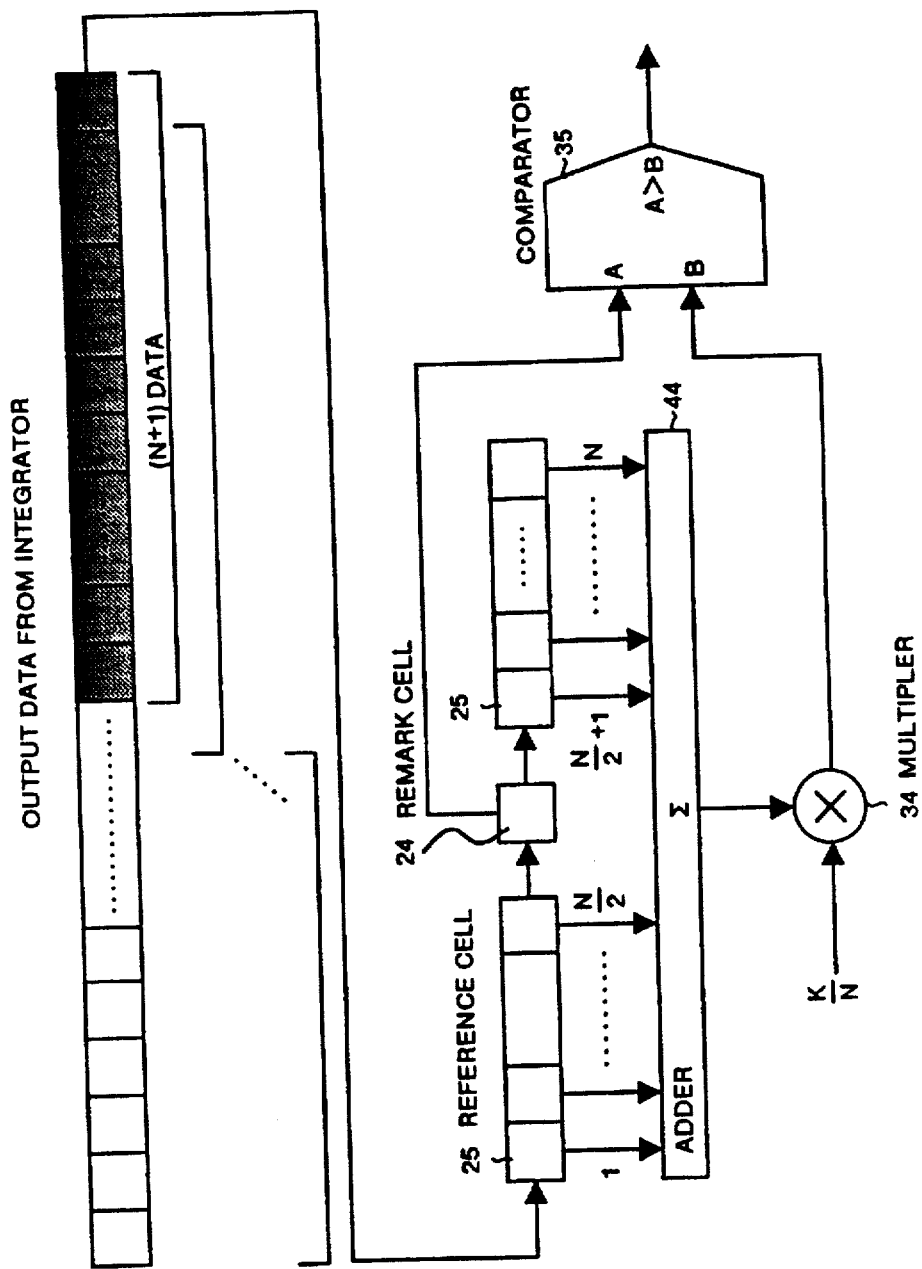
FIG. 12 is a block diagram showing a CA-CFAR circuit which is a target detecting circuit in the conventional type of radar signal processing apparatus.
Figure 13:
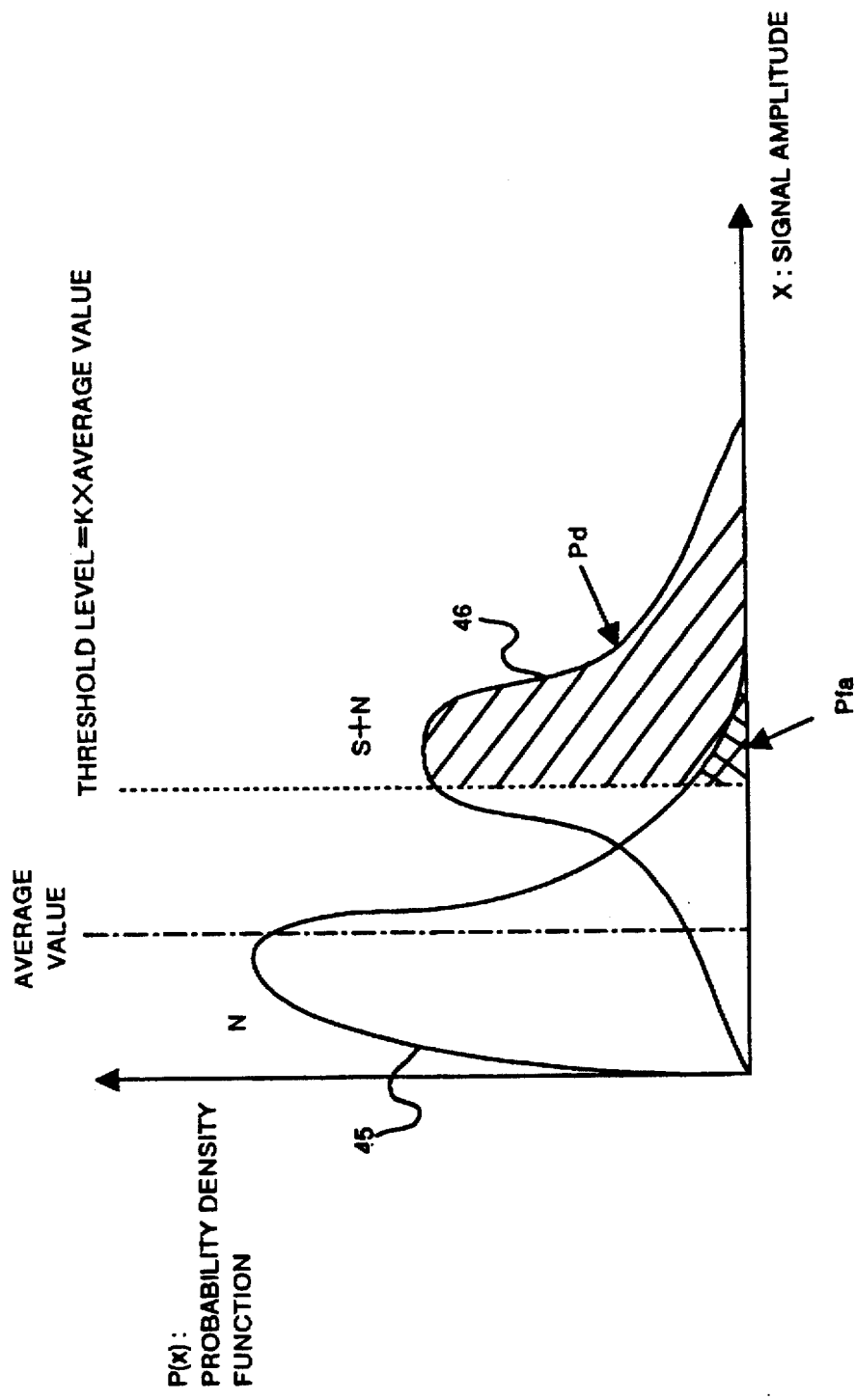
FIG. 13 is a view showing an operating principle of CFAR which is a target detecting circuit.

Next, a description is made for the operations thereof. Herein, N indicates a number of reference cells 25, and $K_1$ and $K_2$ each indicate a threshold factor. Similar to the CA-CFAR previously shown in FIG. 12, a received signal in which a clutter and a noise have been suppressed by the clutter suppressing circuit 1 and the integrator 3 moves sequentially through the reference cells 25 as an input to the CFAR shown in FIG. 9. Data is added by a volume of N/2 in a first half and a second half respectively by the adder 26 to N volume of data stored in the reference cells 25. In the summing device 27, sums are further computed for each of data added in the first half and the second half of the reference cells 25 each computed by the adder 26, and a larger value is selected by the maximum value detector 28, and a smaller value is selected by the minimum value detector 29. On the other hand, the sorter 30 rearranges all output datas from the integrator 3 in the ascending order or descending order according to values of the data, and outputs data in the order previously decided. As described above, the switch-1 31 selects and outputs any of the output data each from the summing device 27, maximum value detector 28, minimum value detector 29 and sorter 30 according to the control provided by the selection control unit 13. Also, threshold factors corresponding to terminal numbers 1 to 4 in the switch-1 31 are stored in the three threshold factor memories 32, and a threshold factor adaptive to the noise distribution is outputted according to the control provided by selection control unit 13. While in the switch-2 33, a threshold factor for a terminal number identical to the terminal number in the switch-1 31 is outputted according to an output from the selection control unit 13. Then, the multiplier 34 multiplies a value of an output from the switch-1 31 by a value of an output from the switch-2 33, and computes a threshold level. The comparator 35 compares a value of the threshold level obtained as described above to a value of the data for remark cell 24, and it is determined that a target is contained in the remark cell 24 if the data for the remark cell 24 is larger, and it is determined that a target is not contained therein if the data for the remark cell 24 is smaller. It should be noted that the target detecting circuit shown in FIG. 9 corresponds to the CFAR section 10 as well as to the select switch 11.

Embodiment 1 of the present invention is constructed as described above, and target detection most suited to the noise distribution is executed, so that it is possible to detect a target while a false alarm probability can be maintained at a constant level even if the distribution of noises does not follow the Rayleigh distribution.

In Embodiment 1 of the present invention, it is possible to determine a noise distribution by matching the noise distribution to the template.

In Embodiment 1 of the present invention, it is possible to detect clutter edges in addition to the determination of the noise distribution by matching the template thereto, which makes it possible to prevent a drop of the target detection probability due to a clutter to a minimum.

In Embodiment 1 of the present invention, it is possible to detect abrupt change of a noise level in reference cells, which makes it possible to prevent a drop of the target detection probability to the minimum even in a case where any other targets other than a target to be detected are close to each other or in a case where any jammer are contained in a signal.

In Embodiment 1 of the present invention, it is possible to select and execute the most suited CFAR with the noise distribution, the presence or the absence of clutter edges, the presence or the absence of a plurality of targets or a jammer, and an external control signal.

Embodiment 2 of the present invention is constructed as described above, and it is possible to determine a noise distribution by using a neural network in place of the template in Embodiment 1.

In Embodiment 2 of the present invention, it is possible to detect clutter edges in addition to the determination of the noise distribution with the neural network, which makes it possible to prevent a drop of the target detection probability due to a clutter to a minimum.

Embodiment 3 of the present invention is constructed as described above, and target detection, most suited to an normal searching or tracking mode according to the noise distribution previously measured by the noise distribution measurement mode, is executed, so that it is possible to detect a target while a false alarm probability can be insured at a constant level if the distribution of noises does not follow the Rayleigh distribution.

In Embodiment 3 of the present invention, it is possible to determine a noise distribution by matching the noise distribution to the template in the noise distribution measurement mode.

In Embodiment 3 of the present invention, it is possible to detect clutter edges in addition to the determination of the noise distribution by matching the template thereto in the noise distribution measurement mode, which makes it possible to prevent a drop of the target detection probability due to a clutter to a minimum.

In Embodiment 3 of the present invention, it is possible to detect abrupt change of a noise level in reference cells in addition to the determination of the noise distribution or the presence or the absence of clutter edges in the noise distribution measurement mode, which makes it possible to prevent a drop of the target detection probability to the minimum even in a case where any other targets other than a target to be detected are close to each other or in a case where any jammer are contained in a signal.

In Embodiment 3 of the present invention, it is possible to select and execute the most suited CFAR with the noise distribution and the presence or the absence of clutter edges each determined in the noise distribution measurement mode, the presence or the absence of a plurality of targets or a jammer, and an external control signal.

Embodiment 4 of the present invention is constructed as described above, and it is possible to determine a noise distribution by using a neural network in the noise distribution measurement mode in place of the template in Embodiment 3.

In Embodiment 4 of the present invention, it is possible to detect clutter edges in addition to the determination of the noise distribution with the neural network in the noise distribution measurement mode, which makes it possible to prevent a drop of the target detection probability due to a clutter to a minimum.

Embodiment 5 of the present invention is constructed as described above, and it is possible to minimize hardware for a target detecting circuit section for most suitably detecting a target.

This application is based on Japanese patent application No. HEI 7-308730 filed in the Japanese Patent Office on Nov. 28, 1995, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radar signal processing apparatus for a searching or tracking radar comprising:

a clutter suppressing circuit for receiving an electric wave reflected by a target as a received signal and removing clutter which is an unnecessary signal;

a linear wave detector for receiving a received signal with clutter having been suppressed by said clutter suppressing circuit and detecting the amplitude;

an integrator for receiving an output from said linear wave detector and improving the S/N;

a noise distribution measurement system for receiving an S/N-improved received signal from said integrator, measuring a distribution of noise contained in the received signal to select one of a plurality of noise distribution patterns, and selecting a system suited to the noise distribution from a plurality of different CFAR (Constant False Alarm Rate) systems based upon the selected noise distribution pattern; and an adaptive type target detecting circuit for switching various types of CFAR circuit systems according to the CFAR system selected by said noise distribution measurement system for the S/N-improved received signal from said integrator and automatically detecting a target.

2. A radar signal processing apparatus according to claim 1; wherein said noise distribution measurement system comprises a noise distribution measuring circuit for calculating an ensemble average of received signals outputted from said integrator and measuring distribution of noise contained in the received signals; a template for storing thereon a plurality of different distribution forms conceivable as noise distribution; and a pattern matching circuit for deciding a noise distribution by matching a noise distribution obtained by said noise distribution measuring circuit to said template.

3. A radar signal processing apparatus according to claim 2; wherein said noise distribution measurement system has an edge detecting circuit which checks for any clutter edge in a received signal outputted from said integrator and outputs a control signal to said noise distribution measuring circuit, when any clutter edge is detected, so that the circuit calculates an ensemble average excluding clutter data and also which outputs a control signal to said adaptive type target detecting circuit so that the circuit selects GO (Greatest Of)-CFAR or SO (Smallest Of)-CFAR from various types of CFAR system.

4. A radar signal processing apparatus according to claim 1; said noise distribution measurement system comprises a noise distribution measuring circuit for calculating an ensemble average of received signals outputted from said integrator and measuring distribution of noises contained in the received signals; tutorial data for storing a noise data array for a plurality of noise distributions each having a different form on a memory; and a neural network for deciding a noise distribution according to a result of learning previously using the tutorial data.

5. A radar signal processing apparatus according to claim 4; wherein said noise distribution measurement system comprises an edge detecting circuit which checks for any clutter edge in received signals outputted from said integrator and outputting a control signal to said noise distribution measuring circuit, when any clutter edge is detected, so that the circuit calculates an ensemble average excluding clutter data, and also which outputs a control signal to said adaptive type target detecting circuit so that the circuit will select GO (Greatest Of)-CFAR or SO (Smallest Of)-CFAR from various types of CFAR systems.

6. A radar signal processing apparatus for a searching or tracking radar comprising:

a clutter suppressing circuit for receiving an electric wave reflected by a target as a received signal and removing clutter which is an unnecessary signal;

a linear wave detector for receiving a received signal with clutter having been suppressed by said clutter suppressing circuit and detecting the amplitude;

an integrator for receiving an output from said linear wave detector and improving the S/N;

a noise distribution measurement system for receiving an S/N-improved received signal from said integrator, measuring a distribution of noise contained in the received signal and selecting a system suited to the noise distribution from a plurality of different CFAR (Constant False Alarm Rate) systems; and an adaptive type target detecting circuit for switching various types of CFAR circuit systems according to the CFAR system selected by said noise distribution measurement system for the S/N-improved received signal from said integrator and automatically detecting a target;

wherein said adaptive type target detecting circuit comprises a noise level change detecting circuit which detects abrupt change of noise level in reference cells in a CFAR and outputs a control signal so that OS (Order Statistic)-CFAR will be selected from various types of CFAR system.

7. A radar signal processing apparatus according to claim 1; wherein said adaptive type target detecting circuit comprises a CFAR section comprising circuits based on CFAR systems corresponding to various types of distribution conceivable as noises contained in received signals; a select switch between various types of CFAR in said CFAR section, and a selection control unit for controlling said select switch to select and execute a CFAR system most suited to an operating situation of the radar or the peripheral environment according to outputs from said pattern matching circuit or said neural network, outputs from said edge detecting circuit, outputs from said noise level change detecting circuit, as well as to external control signals.

8. A radar signal processing apparatus according to claim 1; wherein said adaptive type target detecting circuit shares a threshold level detecting section with various types of CFAR in said CFAR section.

9. A radar signal processing apparatus for a searching or tracking radar comprising:

a clutter suppressing circuit for receiving an electric wave reflected by a target as a received signal and removing clutter which is an unnecessary signal;

a linear wave detector for receiving a received signal with clutter having been suppressed by said clutter suppressing circuit and detecting the amplitude;

an integrator for receiving an output from said linear wave detector and improving the S/N;

a noise distribution measurement mode system for receiving outputs from said integrator in the noise distribution measurement mode, measuring a distribution of noises contained in the received signals to select one of a plurality of noise distribution patterns, and selecting a system suited to the measured noise distribution from a plurality of different CFAR systems based upon the selected noise distribution pattern; and an adaptive type target detecting circuit for switching in a normal searching or tracking mode of the radar various types of CFAR circuit systems depending to a CFAR system decided according to a noise distribution previously measured in the noise distribution measurement mode and automatically detecting a target according to the output from said integrator.

10. A radar signal processing apparatus according to claim 9, wherein said noise distribution measurement mode system comprises a noise distribution measuring circuit for calculating an ensemble average of received signals outputted from said integrator and measuring a noise distribution contained in the received signals; a template for storing a plurality of different distribution patterns conceivable as noise distributions on a memory; a pattern matching circuit for comparing a noise distribution obtained in said noise distribution measuring circuit to said template and deciding a noise distribution; and a memory for storing therein outputs from said pattern matching circuit.

11. A radar signal processing apparatus according to claim 10; wherein said noise distribution measurement mode system comprises an edge detecting circuit which checks for any clutter edge in an received signal outputted from said integrator in the noise distribution measurement mode and outputting a control signal to said noise distribution measuring circuit, when any clutter edge is detected, so that the circuit will calculate an ensemble average excluding clutter data and also outputting a control signal to be stored in said memory to said adaptive type target detecting circuit so that the circuit will select GO (Greatest Of)-CFAR or SO (Smallest Of)-CFAR from various types of CFAR system.

12. A radar signal processing apparatus according to claim 9; wherein said noise distribution measurement mode system comprises a noise distribution measuring circuit for calculating an ensemble average of received signals outputted from said integrator in the noise distribution measurement mode and measuring a noise distribution contained in the received signals; tutorial data for storing a noise data array for each of a plurality of noise distributions each having a different pattern on a memory; a neural network for deciding a noise distribution according to a result of learning previously using the tutorial data; and a memory for storing outputs from said neural network.

13. A radar signal processing apparatus according to claim 12; wherein said noise distribution measurement mode system comprises an edge detecting circuit which checks for any clutter edge in received signals outputted from said integrator in the noise distribution measurement mode and outputs a control signal to said noise distribution measuring circuit, when any clutter edge is detected, so that the circuit will calculate an ensemble average excluding the clutter data, and also which outputs a control signal to be stored in said memory to said adaptive type target detecting circuit so that the circuit will select GO (Greatest Of)-CFAR or SO (Smallest Of)-CFAR from various types of CFAR system.

14. A radar signal processing apparatus for a searching or tracking radar comprising:

a clutter suppressing circuit for receiving an electric wave reflected by a target as a received signal and removing clutter which is an unnecessary signal;

a linear wave detector for receiving a received signal with clutter having been suppressed by said clutter suppressing circuit and detecting the amplitude;

an integrator for receiving an output from said linear wave detector and improving the S/N;

a noise distribution measurement mode system for receiving outputs from said integrator in the noise distribution measurement mode, measuring a distribution of noises contained in the received signals, and selecting a system suited to the measured noise distribution from a plurality of different CFAR systems; and an adaptive type target detecting circuit for switching in a normal searching or tracking mode of the radar various types of CFAR circuit systems depending to a CFAR system decided according to a noise distribution previously measured in the noise distribution measurement mode and automatically detecting a target according to the output from said integrator;

wherein said adaptive type target detecting circuit comprises a noise level change detecting circuit which detects an abrupt change of noise level in CFAR reference cells and outputs a control signal so that OS (Order Statistics)-CFAR will be selected from various types of CFAR system.

15. A radar signal processing apparatus according to claim 9; wherein said adaptive type target detecting circuit comprises a CFAR section comprising circuits based on CFAR systems corresponding to various types of distribution conceivable as noises contained in received signals, a select switch between various CFAR systems in said CFAR section; and a selection control unit for controlling said select switch for selecting and executing the most suited CFAR system depending on the operating situation of the radar or the peripheral environment according to data stored in and outputted from said memory in the noise distribution measurement mode, outputs from said noise level change detecting circuit, as well as to external control signals.

16. A radar signal processing apparatus according to claim 9; wherein said adaptive type target detecting circuit shares a section for detecting a threshold level with various types of CFAR systems in said CFAR section.

* * * * *